United States Patent Office 2,994,189
Patented Aug. 1, 1961

2,994,189
METHOD OF PRODUCING IMMEDIATE THRUST USING FAST BURNING FUELS
Cleveland Rex Scott, Bartlesville, Okla., assignor to Phillips Petroleum Company, a corporation of Delaware
No Drawing. Filed Jan. 4, 1954, Ser. No. 402,145
11 Claims. (Cl. 60—35.4)

This invention relates to fast burning fuels. In one of its more specific aspects, it relates to rocket propellants. In another of its more specific aspects, it relates to hypergolic fuels. In another of its more specific aspects, this invention relates to the propulsion of a mass by the spontaneous ignition of a fuel to produce immediate thrust. In another of its more specific aspects, this invention relates to improved hydrocarbon fuels containing additive materials to improve their burning characteristics.

This invention is concerned with the use of materials which have very fast burning characteristics. The invention is particularly concerned with new and novel rocket propellants and their utilization; a rocket or jet propulsion device being defined herein as a rigid container for matter and energy, so arranged that a portion of the matter can absorb the energy in kinetic form and subsequently be ejected in a specified direction. The type rocket to which this invention is generally applied is that type of jet propulsion device designated as a "pure" rocket, i.e., a thrust producer which does not make use of the surrounding atmosphere. A rocket of this type which may be operated in accordance with this invention is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight, low pressure vessel and pumped into the combustion chamber, the latter being only necessarily large enough to ensure combustion. Also, the flow of liquid propellant into the combustion chamber can be regulated at will so that the thrust, continuous or in intermittent bursts of power, can be sustained.

Another rocket which is adaptable to operation according to this invention is one in which a solid propellant is maintained in the combustion chamber or is fed into the combustion chamber in a particulate form. An oxidant material, preferably in a liquid condition, is either continuously or intermittently injected into the combustion chamber in contact with the solid fuel which spontaneously ignites so as to provide continuous or intermittent bursts of power which can be carefully controlled by the injection of the oxidant material into contact with the solid fuel.

Various liquids and liquid combinations have been found to be useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide and liquid oxygen as the oxidant with a fuel component such as ethyl alcohol-water, ammonia, hydrazine or hydrogen; and nitric acid as the oxidizer with aniline or furfural alcohol as the hypergolic fuel component.

When employing 90 to 100 percent or more of nitric acid, i.e., "white fuming nitric acid," as the oxidizer in a rocket bipropellant, it is often necessary, dependent upon the specific fuel component, to make ignition more prompt by dissolving from 6 to 14 percent by weight of nitrogen dioxide in the white fuming nitric acid, thus forming "red fuming" nitric acid. A fuel component of a bipropellant material of the type described herein, is spontaneously ignited upon contacting the oxidizer, and for that reason, is referred to herein as being "hypergolic." A ratio of oxidizer to hypergolic fuel based on stoichiometric amounts can be utilized within the limits of 0.5:1 to 1.5:1, if desired, the efficiency of the combustion being less at ratios above 1:1. However, practical consideration may necessitate the use of higher ranges, even as high as 6:1.

The following objects of this invention will be attained by the various aspects of this invention.

An object of this invention is to provide an improved fuel. Another object of this invention is to provide new rocket propellants. Another object of this invention is to provide hypergolic fuels. Another object of this invention is to provide a method for producing immediate thrust to a mass by the spontaneous combustion of a fuel therein. Another object of this invention is to provide an improved fuel suitable for use in internal combustion reciprocating type engines. Other and further objects of this invention will be apparent to those skilled in the art upon study of the accompanying disclosure.

Broadly speaking, this invention comprises the use of a metallo-organic compound or mixtures thereof of metals having an atomic weight of at least 51, as hypergolic fuel, per se, hypergolic materials diluted with a portion of a diluent such as liquid hydrocarbons, alcohols, or the like, or as additive materials for normally liquid hydrocarbons or mixtures thereof. The metallo-organic compounds which are used in this invention are characterized by the structural formulae $$MR_n, R_zMMR_z \text{ and } R_zMYMR_z$$

wherein at least one R includes a hydrocarbon radical and R is selected from the group consisting of —O—R′, —S—R′,

R′, a halogen, =O and =S; Y is selected from the group consisting of —O$_x$—, —S$_x$—,

and a divalent hydrocarbon radical having from 1 to 10 carbon atoms; M is a metal having an atomic weight of at least 51; R′ is selected from the group consisting of hydrogen and a hydrocarbon radical having from 1 to 10 carbon atoms; n is an integer in the range of 1 to the valence of the metal; z is an integer in the range of 1 to the valence of the metal minus 1; and x is an integer in the range of from 1 to 3. The divalent hydrocarbon radicals may be further defined as a hydrocarbon radical selected from the group consisting of alkyl, alkenyl, aryl, cycloalkyl, cycloalkenyl, aralkyl, and alkaryl radicals. The alkyl radicals are preferably those having not more than 5 carbon atoms per molecule. Illustrative of the metallo-organic materials suitable for use in this invention are the following: tetraethyllead, tetramethyllead, dimethylzinc, triethylthallium, dimethyldiethyltin, phenyltribenzyltin, hexaethyldigermanium, ethoxytriethyltin, tetra(methylthio) germanium, trimethyltin hydride, triethyltin bromide, cyclopentamethylenegermanium dichloride, bis(triethylgermanium) oxide, bis(trimethyltin) sulfide, bis(triethylgermanium)amine, antimony ethoxide, triethylantimony, trimethylantimony, cacodyl oxide, cacodyl sulfide, dimethylarsine, dimethylbromarsine, dimethylchlorarsine, methylarsine, tetraethyldiarsine, tetraethyldiarsyl, tetramethyldiarsyl, triethylarsine, trimethylarsine, methylbismuthine, triethylbismuthine, trimethylbismuthine, dibutylcadmium, diethylcadmium, diisoamylcadmium, diisobutylcadmium, dimethylcadmium, dipropylcadmium, triethylgallium, triethylgallium monoamine, triethylgallium monoetherate, trimethylgallium, trimethylgallium monoetherate, bis-trichlorogermanylmethane, bis-triethylgermanyl sulfide, diethylcyclopentamethylenegermanium, diethyldiphenylgermanium, diethylgermanium bromide, diethylgermanium chloride, diethylgermanium imine, diethylgermanium iodide, diethylgermanium oxide, diphenylgermanium dibromide, diphenylgermanium dichloride, diphenylgermanium difluoride, diphenyl-sec-propylgermanium bromide, di-p-tolylgermanium dibromide, ethylgermanium tribromide, ethylgermanium trichloride, ethylgermanium trifluoride, ethylgermanium triiodide, ethyl-sec-propyldiphenylgermanium, phenylethyl-sec-propylgermanium bromide, phenylgermanium tribromide, phenylgermanium trichloride, tetra-i-amylgermanium, tetra-n-amylthiogermanium, tetra-n-butylgermanium, tetra-p-tert-butylphenylthiogermanium, tetra-n-butylthiogermanium, tetra-sec-butylthiogermanium, tetraethoxylgermanium, tetraethylgermanium, tetraethylthiogermanium, tetra-iso-butylthiogermanium, tetraisopropylthiogermanium, tetramethylgermanium, tetramethylthiogermanium, tetraphenoxygermanium, tetrapropylthiogermanium, tolylgermanium tribromide, tolylgermanium trichloride, triethylgermanium bromide, triethylgermanium chloride, triethylgermanium fluoride, triethylgermanium hydride, triethylgermanium imine, triethylgermanium iodide, triethylgermanium oxide, triethylphenylgermanium, triethyl-p-tolyl-germanium, trimethylgermanium bromide, trimethylphenylgermanium, tri-o-tolylgermanium bromide, tri-o-tolylgermanium chloride, hexaethyldilead, tetraisopropyllead, tetra-n-propyllead, diethylmercury, diisobutylmercury, dimethylmercury, dipropylmercury, trimethylrhenium, di-n-butyl telluride, dimethyl telluride, dibenzyldiethylstannane, dibenzylethylpropylstannane, diethyltin, diisoamyltin diiodide, dipropyltin diiodide, hexaethylditin, tetra-n-amyltin, tetra-n-butyltin, tetraethyltin, tetraisoamyltin, tetraisobutyltin, tetramethyltin, tetrapropyltin, tolyltrichlorostannane, triethylphenyltin, triethyltin, triethyltin chloride, triethyltin ethoxide, triethyltin iodide, triisobutyltin iodide, trimethylethyltin, trimethyltin, trimethyltin bromide, trimethyltin hydride, trimethyltin iodide, trimethyltin sulfide, tripropyltin chloride, tri-n-propyltin iodide, di-n-butylzinc, diethylzinc, di-n-propylzinc, tetradodecyl tin, tridodecyl arsenic, triphenylantimony, benzyltriphenylgermanium, phenyltri-p-tolylgermanium, tetra-p-biphenylgermanium, tetra-p-tert-butylphenylthiogermanium, tetracetylthiogermanium, tetracyclohexylthiogermanium, tetra(2-phenylethyl)germanium, tetra-N-pyrrylgermanium, tetra-o-tolylgermanium, tetra-p-biphenylylgermanium, ditolylmercury, tetrabenzyltin, bis(tribenzylgermanium)sulfide, bis(tribiphenyl)germaniumsulfide, bis(tricyclohexylgermanium)disulfide, bis(tritolylgermanium)sulfide, and bis(triphenylgermanium)methane.

These metallo-organic compounds are hypergolic, per se, and are also hypergolic when admixed with non-hypergolic materials, particularly hydrocarbons and alcohols even in a state of dilution as high as 80 percent by volume, though it is preferred to dilute these materials to form hypergolic fuels by not over 60 percent by volume. Suitable non-hypergolic diluents include the normally liquid hydrocarbons in the $C_5$ to $C_{35}$ range, preferably in the $C_5$ to $C_{16}$ range, or mixtures thereof, particularly hydrocarbon fuels in the gasoline boiling range, jet fuels, normal hexane, normal heptane, benzene, kerosene, isooctane, diisopropyl, diisobutylene, cyclohexene, cyclohexane, isodecane, methylcyclohexane, toluene, hexadecane, eicosane, hexacosane, tetratriacontane, picene, cyclononacosane, tetraphenylethylene, and the like. The hypergolic materials used in this invention may also be mixed with other hypergolic materials which are known in the art. These hypergolic materials may be used in true solutions, slurries and suspensions.

Mercaptans may also form a portion of the hypergolic fuel constituent of this invention in admixture with the above-described metallo-organic compounds. These mercaptans include compounds of the general formula RSH, when R is selected from the group consisting of alkyl and alkenyl groups containing from 3 to 10 carbon atoms. Illustrative of the mercaptans used in this invention are tert-butyl mercaptan, isopropyl mercaptan, allyl mercaptan, n-butyl mercaptan, n-hexyl mercaptan, tert-hexyl mercaptan, tert-octyl mercaptan, nonyl mercaptan, tert-decyl mercaptan, isopropenyl mercaptan, $\Delta^1$-butenyl mercaptan, $\Delta^2$-butenyl mercaptan, $\Delta^3$-butenyl mercaptan, isobutyl mercaptan, and the like. These mercaptans can be used in admixture with the metallo-organic compounds in amounts of up to 85 percent, preferably 75 percent by volume of the mixture.

Strong oxidizers or oxidants which are suitable for use in connection with the hypergolic materials used in this invention are, in addition to white and red fuming nitric acid, such materials as hydrogen peroxide, ozone, nitrogen tetroxide, liquid oxygen and mixed acids, wherein nitric acid is present in an amount of at least 80 percent by volume of the acid mixture and at least one additional mineral acid, such as fuming sulfuric acid, is mixed therewith to form the oxidant mixture. It is within the scope of this invention to employ, preferably dissolved in the oxidizer, ignition catalysts or oxidation catalysts. These oxidation catalysts include certain metal salts, such as the chlorides and naphthenates of iron, zinc, cobalt, and similar heavy metals.

The advantages of this invention are illustrated by the following examples. The reactants and their proportions and their specific ingredients are presented as being typical and should not be construed to unduly limit the invention.

EXAMPLE I

A sample of tetraethyllead compound containing 64.8 volume percent (61.4 weight percent) of tetraethyllead, 28.5 volume percent (35.7 weight percent) of non-hypergolic ethylene dibromide, and 6.7 volume percent of a non-hypergolic mixture of kerosene, impurities, and dye (2.87 weight percent of kerosene and impurities and 0.0362 weight percent of 1,4-(di-isopropyl)-anthraquinone as the dye) was tested for spontaneous ignition employing both white fuming nitric acid (WFNA) and red fuming nitric acid (RFNA) as the oxidizer. In each test, 0.13 ml. of a mixture of the tetraethyllead sample with varying percentages of pure grade n-heptane was dropped into a 1″ x 8″ test tube containing 0.3 ml. of either white or red fuming nitric acid. The mixture of tetraethyllead compound and hydrocarbon, upon coming into contact with the fuming nitric acid, ignited spontaneously. The amount of n-heptane diluent was increased by increments of 10 percent to determine the maximum amount of dilution that the tetraethyllead compound could tolerate and still retain the property of being hypergolic. Tests were conducted at room temperature, i.e., at about 70° F. In Table 1 below are given the maximum dilutions at which the tetraethyllead retained its self-ignition properties. The results given for pure tetraethyllead are those calculated from the tetraethyllead compound assuming that the 35.5 volume percent of ethylene bromide and other constituents function as diluent along with the n-heptane. The ethylene bromide, dye, and kerosene are known to be non-hypergolic materials.

*Table 1*

|  | Maximum Percentage Dilution | |
|---|---|---|
|  | WFNA | RFNA |
| Tetraethyllead compound | 50 | 70 |
|  | [1] 60 | 70 |
| Tetraethyllead (pure) | 70 | 80 |
|  | [1] 70 | 80 |

[1] New WFNA.

EXAMPLE II

A mixture of 16.2 percent tetraethyllead, 8.8 percent tetraethyllead impurities, and 75 percent tert-butyl mercaptan ignited spontaneously when added slowly to fuming nitric acid at room temperature.

These examples clearly demonstrate the unexpected property of the organo-metallic materials used in this invention, which I have found. As is well known, tetraethyllead is commonly used as an anti-knock agent in hydrocarbon fuels. It is completely unexpected that this material, per se, would be hypergolic in the presence of a strong oxidant or that it would further be hypergolic when diluted to an extent of as high as 80 percent by volume.

As an added feature of this invention, and as pointed out above, the organo-metallic materials used in this invention are also useful as additive materials for improved hydrocarbon fuels and also are useful as additives for an alcohol fuel used in rocket engines and the like where a hypergolic fuel is not necessarily required. For example, the fast burning fuel components of this invention dissolve in a liquid hydrocarbon as described above, such as a gasoline, a jet fuel, a kerosene, a naphtha, or a petroleum fraction having a boiling point usually not greater than 800° F., even if the resulting solution is not hypergolic with an oxidant, such as fuming nitric acid, can be used, together with an oxidant and a suitable igniter, as a rocket propellant. These fast burning fuels are particularly useful if, for various reasons, a hypergolic fuel is not desired or required. The metallo-organic materials used in this invention may be added to the hydrocarbon liquid in a minor amount, usually from 10 to 40 percent, preferably from 15 to 40 percent, by volume of the total mixture, to produce fast burning fuels. Where the fuel is to be used in a rocket, ordinarily it will be desirable to add from 15 to 40 percent of the metallo-organic material to the hydrocarbon liquid.

As will be evident to those skilled in the art, various modifications can be made or followed, in the light of the foregoing disclosure and discussion, without departing from the spirit and scope of this invention.

I claim:

1. A fuel composition consisting essentially of a normally liquid hydrocarbon in the $C_5$ to $C_{35}$ range and a mixture of at least 20 percent by volume of an organo-lead compound of the formula $PbR_4$ wherein each R group is individually selected from alkyl radicals containing 1 to 10 carbon atoms and up to 75 percent by volume of at least one mercaptan having the general formula RSH wherein R is selected from the group consisting of alkyl and alkenyl groups containing from 3 to 10 carbon atoms.

2. The fuel of claim 1 wherein said organo-lead compound is tetraethyllead.

3. The fuel of claim 1 wherein said organo-lead compound is tetramethyllead.

4. The fuel of claim 1 wherein said mercaptan is tert-butyl mercaptan.

5. A fuel composition consisting essentially of a normally liquid hydrocarbon in the $C_5$ to $C_{16}$ range and a mixture of at least 20 percent by volume of an organo-lead compound of the formula $PbR_4$ wherein each R group is individually selected from alkyl radicals containing 1 to 10 carbon atoms and up to 75 percent by volume of at least one mercaptan having the general formula RSH wherein R is selected from the group consisting of alkyl and alkenyl groups containing from 3 to 10 carbon atoms.

6. The fuel of claim 5 wherein said organo-lead compound is tetraethyllead and said mercaptan is tert-butyl mercaptan.

7. A method of producing immediate thrust to a mass, comprising contacting an oxidant selected from the group consisting of white fuming nitric acid, red fuming nitric acid, hydrogen peroxide, ozone, nitrogen tetroxide, liquid oxygen, and a mixture of at least 80 percent by volume of a fuming nitric acid and fuming sulfuric acid, with a fuel component consisting essentially of a non-hypergolic fuel selected from the group consisting of normally liquid hydrocarbons in the $C_5$ to $C_{35}$ range and mercaptans in the $C_3$ to $C_{10}$ range, containing at least 20 percent by volume of at least one organo-lead compound of the formula $PbR_4$ wherein each R is individually selected from the group consisting of alkyl radicals containing 1 to 10 carbon atoms.

8. The method of claim 7 wherein said organo-lead compound is tetraethyllead.

9. The method of claim 7 wherein said organo-lead compound is tetramethyllead.

10. The method of claim 7 wherein said mercaptan is tert-butyl mercaptan.

11. The method of claim 7 wherein said organo-lead compound is tetraethyllead and said mercaptan is tert-butyl mercaptan.

References Cited in the file of this patent

UNITED STATES PATENTS

| Number | Name | Date |
|---|---|---|
| 1,534,573 | Riboisiere | Apr. 21, 1925 |
| 1,575,438 | Midgley | Mar. 2, 1926 |
| 2,557,018 | Viles | June 12, 1951 |
| 2,559,071 | Hannum | July 3, 1951 |
| 2,698,510 | Britton et al. | Jan. 4, 1955 |
| 2,750,732 | Condit et al. | June 19, 1956 |
| 2,764,866 | Wasserbach et al. | Oct. 2, 1956 |
| 2,775,863 | Traverse | Jan. 1, 1957 |

OTHER REFERENCES

Astronautics, No. 26, May 1933, p. 6.

Leonard: Journal of the American Rocket Society, No. 72, December 1947, pages 10–23 incl.

Chemical & Engineering News, vol. 26, No. 39, Sept. 27, 1948, pp. 2892, 2893.

Journal of the American Rocket Society, March 1949, p. 38.

Krause: "Jet Fuel and The Refiner," in The Petroleum Engineer, November 1952, page C–9.